US011370186B2

(12) United States Patent
Vidal et al.

(10) Patent No.: US 11,370,186 B2
(45) Date of Patent: Jun. 28, 2022

(54) METHOD AND APPARATUS FOR FORMING A CORRUGATED FLUOROPOLYMER TUBE

(71) Applicant: Kongsberg Actuation Systems Ltd., Normanton (GB)

(72) Inventors: Sam Vidal, Huddersfield (GB); Darren Conway, Wakefield (GB)

(73) Assignee: Kongsberg Actuation Systems Ltd., Normanton (GB)

( * ) Notice: Subject to any disclaimer, the term of this patent is extended or adjusted under 35 U.S.C. 154(b) by 294 days.

(21) Appl. No.: 16/092,971

(22) PCT Filed: Apr. 13, 2016

(86) PCT No.: PCT/EP2016/058145
§ 371 (c)(1),
(2) Date: Oct. 11, 2018

(87) PCT Pub. No.: WO2017/178047
PCT Pub. Date: Oct. 19, 2017

(65) Prior Publication Data
US 2019/0061227 A1    Feb. 28, 2019

(51) Int. Cl.
*B29D 23/18* (2006.01)
*B29C 57/12* (2006.01)
(Continued)

(52) U.S. Cl.
CPC ............ *B29D 23/18* (2013.01); *B29C 43/226* (2013.01); *B29C 48/13* (2019.02); *B29C 53/30* (2013.01);
(Continued)

(58) Field of Classification Search
CPC . B29C 53/30; B29C 43/226; B29C 2043/463; B29C 48/13; B29C 59/021; B29C 59/043; B29D 23/18
See application file for complete search history.

(56) References Cited

U.S. PATENT DOCUMENTS

| | | | | |
|---|---|---|---|---|
| 2,801,441 A | * | 8/1957 | Wadsworth | B29D 23/00 264/209.2 |
| 3,648,502 A | * | 3/1972 | Klug | B21C 37/207 72/78 |
| 3,998,579 A | * | 12/1976 | Nordstrom | B29C 48/09 425/393 |

(Continued)

FOREIGN PATENT DOCUMENTS

| | | |
|---|---|---|
| EP | 0474449 B1 | 6/1995 |
| EP | 1141605 B1 | 10/2002 |
| EP | 2014446 A1 | 1/2009 |

OTHER PUBLICATIONS

International Search Report for PCT/EP2016/058145; dated July 5, 2016; 2 pages.

*Primary Examiner* — Benjamin A Schiffman
(74) *Attorney, Agent, or Firm* — Howard & Howard Attorneys PLLC

(57) ABSTRACT

A method of forming a corrugated fluoropolymer tube is disclosed. The method comprises the step of providing a tube comprising extruded fluoropolymer without corrugations or convolutions disposed on a mandrel. The mandrel has a first cylindrical portion and a flaring portion that extends to a second cylindrical portion, the second portion having an outer diameter which is larger than an outer diameter of the first portion. The method also includes the step of moving the tube on a longitudinal axis along the mandrel thereby forcing an outer surface of the tube into flights disposed at a pitch angle on a plurality of thread rollers which are rotating, the plurality of thread rollers adjacent to and circumferentially distributed around the flaring portion and/or second cylindrical portion of the mandrel, wherein external force is exerted on the outer surface of the tube to form corrugations having adjacent peaks and roots.

17 Claims, 6 Drawing Sheets

(51) Int. Cl.
    *B29C 48/13*     (2019.01)
    *B29C 43/22*     (2006.01)
    *B29C 53/30*     (2006.01)
    *F16L 9/06*     (2006.01)
    *B29L 23/18*     (2006.01)
    *B29K 27/12*     (2006.01)
    *B29K 27/18*     (2006.01)
    *B29C 59/02*     (2006.01)
    *B29C 43/46*     (2006.01)
    *B29C 59/04*     (2006.01)

(52) U.S. Cl.
    CPC .............. *B29C 57/125* (2013.01); *F16L 9/06* (2013.01); *B29C 59/021* (2013.01); *B29C 59/043* (2013.01); *B29C 2043/463* (2013.01); *B29K 2027/12* (2013.01); *B29K 2027/18* (2013.01); *B29L 2023/18* (2013.01)

(56) References Cited

U.S. PATENT DOCUMENTS

| | | | | |
|---|---|---|---|---|
| 4,043,161 A * | 8/1977 | Toma | ................ | B21D 15/06 |
| | | | | 72/78 |
| 4,053,274 A * | 10/1977 | Lemelson | ............... | B29C 48/09 |
| | | | | 425/381 |
| 4,292,113 A * | 9/1981 | Hirata | ................ | B29C 53/30 |
| | | | | 156/428 |
| 4,427,616 A * | 1/1984 | Ketcham | ................ | B29C 53/30 |
| | | | | 264/286 |
| 4,721,594 A * | 1/1988 | Jarvenkyla | ............. | B29D 23/18 |
| | | | | 264/508 |
| 7,670,528 B2 * | 3/2010 | Patel | ................ | B01D 29/213 |
| | | | | 264/287 |
| 2009/0014906 A1 * | 1/2009 | Hwang | ................ | B29C 53/30 |
| | | | | 264/209.3 |
| 2016/0059474 A1 * | 3/2016 | Singstad | ............. | B29C 35/0805 |
| | | | | 138/145 |

* cited by examiner

METHOD AND APPARATUS FOR FORMING A CORRUGATED FLUOROPOLYMER TUBE

CROSS-REFERENCE TO RELATED APPLICATIONS

This application is the National Stage of International Patent Application No. PCT/EP2016/058145, filed on Apr. 13, 2016, the content of which is incorporated herein by reference.

The present invention is directed to a method for forming a corrugated fluoropolymer tube comprising the steps of: providing a fluoropolymer tube on a mandrel; and exerting external force on outer surface regions of the tube beyond the elastic limit of the fluropolymer material of the tube to form corrugations having adjacent peaks and roots by displacing material from the root regions at a temperature below the melting temperature, while maintaining a relatively smooth inner bore. The invention is further directed to an apparatus for carrying out such method.

Corrugated plastic tubes are used in various fields of application, for example in the automotive industry, wherein corrugated tubes are used because of their superior bending capabilities. There are two basic types of corrugated tubes, namely first those made by processes which concertina an originally cylindrical tube which results in a convoluted tube wall with substantially uniform wall thickness. A second kind of corrugated plastic tubes is formed by processing an originally more or less cylindrical tube by exerting external force on regions of the outer wall of the tube such that material is displaced from the regions where forces exerted and where roots are formed which are separated by peaks. In the regions of roots the wall thickness is reduced. On the other hand, the inner wall of the tube is still smooth because the tube is placed on a mandrel during the formation of roots and peaks by displacement of material. The inner wall of the tube is affected to very little extent by the corrugation process, but nevertheless slight and smooth unevenness may result also on the inner wall which is, however, much less pronounced than the corrugations on the outer wall. For this reason the inner wall of the tube is referred to as "relatively smooth" to express that there may be slight deviations from the ideal cylindric inner wall form which are relative to the outer wall much less pronounced. The present invention is directed to corrugated tubes of the second kind.

Fluoropolymers are widely used in automotives, aircrafts, semiconductors, and common household appliances because of their unique non-adhesive and low friction properties as well as their superior heat, chemical and weather resistance and superior electrical properties compared with the other polymers. In particular, flexible fluoropolymer tubes exhibit excellent properties such as strength, wear resistance and dimensional stability when subjected to repeated flexing due to vibration, bending, or the like. A widely used fluoropolymer material for tubing is polytetrafluorethylene (PTFE). Other examples of fluoropolymer tubing are tubes made of fluorinated ethylenepropylene (FEP) and perfluoroalkoxy polymer (PFA), and polyvinylidene fluoride (PVDF).

A method for making a corrugated tube is for example disclosed in EP 1 141 605 B1. The teaching of this document is restricted to PTFE tubes. The general teaching of this document can be summarized as providing a process comprising: (1) subjecting the PTFE tube to a deformation force at a temperature at or above the gel transmission temperature of PTFE to produce constrained convolutions having a thinned wall $W_1$; and (2) cooling the PTFE tube to below the gel transmission temperature whilst continuing to constrain the deformations having the thinned wall $W_1$ until the convolutions having the thinned wall $W_1$ have becomes stable. The process starts with providing a cylindrical PTFE tube of uniform wall thickness on a mandrel and heating it to 380° C. A helical tool with an internal diameter which is greater than the outside diameter of the mandrel but less than the combined diameter of the outside diameter of the mandrel and twice the wall thickness $W_0$ of the plastic tube is brought into contact with the tube so that its leading end applies a pressure sufficient to displace material to form a smooth bore convoluted tube at a temperature above the gel transition temperature. The following end of the tool is maintained at a temperature below the gel transition temperature such that the following end of the tool cooled the convoluted tube to below the gel transition temperature whilst applying a restraining force such that the convolutions become stable. The helical tool is rotated relative to the mandrel to form the corrugations in the described manner. However, such process is not very efficient since the entire tube has to be heated up to a high temperature and since the helical tool can be rotated relative to the tube rather slowly only so that the cooled gelling end of the tool is able to cool down the adjacent tube material below the gel transition temperature by heat conduction from the PTFE material to the cooled tool material. Therefore, a process speed is low which implies a low productivity of the process.

EP 0 474 449 B1 discloses a method according to the preamble of claim 1. PTFE is described as an exemplary tube material. In a general way the method described is providing a corrugated plastic tube, having a wall with an inner surface and an outer surface, and corrugations which define a series of peaks and roots along the tube, the thickness of the wall between the inner surface and outer surface of the wall at the peaks, the peak wall thickness W, being greater than the thickness between the inner surface and outer surface of the wall at the roots, the root wall thickness $W_1$. To achieve this the tube has been subjected to a compression force to displace material in the root regions, and the compression force applied was sufficient to take the polymer material, which is at a temperature below its melt temperature, beyond its elastic point. In one embodiment shown in FIG. 5c a corrugated tube with a smooth bore is shown, i.e. the inner bore wall is cylindrical and not corrugated, whereas on the outer surface peaks are formed separated by roots. In the general part of the description it is described that the process starts with an initially convoluted tube which is slid over a close fitting mandrel. A helical tool with an internal diameter which is greater than the outside diameter of the mandrel, but less than the combined diameter of the outside diameter of the mandrel and twice in the wall thickness of the convoluted plastic tube is brought into contact with the tube so that a pressure sufficient to displace material from the root region is created. The leading end of the tool is kept hot whilst the following end of the tool is kept cold. The helical tool is then helically wound along the mandrel allowing sufficient time to permit the hot end of the tool to warm up the plastics material to heat treatment temperature at the root regions of the tube. Although the treatment temperature is required to be below the melting temperature the described heating of the material by heat conduction from the tool is a slow process which limits the process speed and thus the productivity that can be achieved.

It is an object of the present invention to provide a method for forming corrugated fluoropolymer tubes by which external corrugation can be formed on the external surface of a fluoropolymer tube in a fast and efficient manner, while at the same time a smooth inner wall of the tube is preserved. In addition, it is an object to provide an apparatus for carrying out such method.

This object is achieved by providing a method comprising the steps of claim 1, and by providing an apparatus comprising the features of claim 14.

According to the method of the present invention external forces are exerted to form external corrugations on the tube is performed by moving the tube along a mandrel having a first cylindrical portion and a flaring porting extending to a second cylindrical portion having a large diameter to expand the tube in the flaring portion. This expansion of the tube in the flaring portion of the mandrel improves a centered positioning of the tube on the mandrel relative to the longitudinal axis of the mandrel even if there is any shape irregularity in the tube such as an ovality in certain portions along the length of the tube or any other deviation from an ideal cylindrical shape. Along the flaring portion and/or the subsequent enlarged diameter cylindrical portion of the mandrel an arrangement of a plurality of thread rollers is mounted which are disposed circumferentially distributed around the mandrel. The thread roller rotational axes are generally aligned with the longitudinal axis of the mandrel, i.e. are parallel to or inclined at a small acute angle with respect to the longitudinal axis of the mandrel. There can be for example two thread rollers circumferentially displaced by 180° at the same radial distance around the mandrel.

The thread rollers are provided with flights that are disposed at a pitch angle with respect to the longitudinal axis of the mandrel and the tube, which pitch angle corresponds to the pitch of the corrugation threads to be formed on the tube. The thread rollers are rotating around the tube relative to the tube, i.e. either the thread roller arrangement as a whole is rotating relative to the tube on the mandrel which are not rotating, or the tube is rotating relative to a stationary thread rollers which are rotating around their thread roller axes.

By forcing the outer surface of the tube in the expanding or expanded state of the tube into profiles of the flights of the thread rollers which are rotating around the longitudinal roller axes and which are rotating around the tube, material in the tube surface is displaced in a cold forming process manner to provide threads on the external surface of the tube, which threads form the desired corrugations with adjacent roots and peaks. This process is in certain aspects comparable to thread milling processes which are utilized to form threads on cylindrical metal shafts. According to the present invention it has been found that circumferentially distributed thread rollers acting on an expanding or expanded fluoropolymer tube can produce the desired corrugations in a very efficient manner.

In a preferred embodiment the process starts with an extruded fluoropolymer tube without corrugations or convolutions. This means that the tube that is initially slid on the mandrel is generally cylindrical and has a generally constant wall thickness, wherein deviations from the ideal cylindrical shape and variations of the wall thickness are possible as caused by the extrusion process for making the fluoropolymer tube.

In a preferred embodiment each of the thread rollers comprises a sequence of adjacent annular flights disposed in a plane perpendicular to the longitudinal axis of the thread roller, wherein the pitch angle of the flights is realized by disposing the thread rollers such that their longitudinal axis is disposed at the pitch angle with respect to the longitudinal axis of the mandrel, i.e. the longitudinal axes of a thread rollers are slightly inclined with respect to the longitudinal axis of the mandrel (by the pitch angle).

In a preferred embodiment the depth of the roots formed by the flights is increased while the fluoropolymer tube is moved along the thread rollers by arranging the adjacent flights of each thread rollers such that the heights of the flights over the roller surface increase in moving direction of the tube through the thread rollers. In this manner material is displaced from the root region in a progressive manner when the tube is transported along the flights with increasing heights.

Alternatively to separate annular flights as described above the flights of each thread roller are formed by a single continuous helical flight. In this case the longitudinal axis of the thread rollers could be parallel to the longitudinal axis of the mandrel, or could be inclined at a low, acute angle such that the pitch angle of the corrugations formed is the sum of the pitch of the helical flight of the thread rollers and the angle of inclination of the longitudinal axes of the thread rollers with respect to the longitudinal axis of the mandrel.

In a preferred embodiment the movement of the tube through the thread rollers and along the mandrel is supported by a transport mechanism conveying the tube at a controlled speed which is determined by the pitch angle and the rotational speed of the thread rollers, wherein preferably the transport mechanism includes a feed caterpillar disposed upstream of the thread rollers and a pull caterpillar downstream of the thread rollers. Alternatively, it is in principle possible to omit a transport mechanism and to drive the thread rollers for rotation such that the rotation of the thread rollers in combination with the pitch angle creates an advancing force on the tube which moves it forward.

In a preferred embodiment said exerting of external force is taking place in the enlarged diameter second cylindrical portion of the mandrel.

In a preferred embodiment the fluoropolymer material of the tube is heated such that it is at an elevated temperature when the thread rollers act on it to form the corrugations. This heating can be achieved for example by heating the thread rollers themselves. Alternatively or in addition hot air can be directed towards the tube in an area where the thread rollers are acting on the tube material or at a distance upstream of the flights of the thread rollers.

In a preferred embodiment the thread rollers are rotated by rotating a thread roller head in which the thread rollers are mounted circumferentially distributed around the mandrel and freely rotational around their longitudinal axes, wherein the rotational axis of the thread roller head is parallel and coaxial to the longitudinal axis of the mandrel. In this manner the thread rollers roll on the tube while the thread roller head is rotating around the tube. In such arrangement no drive mechanism for the individual thread rollers is needed, but only a drive mechanism to rotate the thread roller head as a whole.

Alternatively the individual thread rollers can be driven for rotation so that the rotation of the thread rollers with the flights at a pitch angle advances the tube to move the tube along the mandrel.

In a preferred embodiment the temperature of the inner core of the mandrel is temperature controlled to be at a predetermined temperature; in particular it is preferred that the mandrel is cooled by pumping a coolant through a passage extending along the mandrel. This may assist in keeping the inner wall of the tube cool and thus may reduce the degree of deformations of wall to keep a smooth bore.

In a preferred embodiment the tube is cooled after it passed the thread rollers to stabilize its temperature to ensure it can be handled upon exit from the thread rollers, which prevents any further unwanted deformation after exiting the thread roller head. This is in particular preferred if the tube material has been heated up before or when passing the thread rollers.

In another aspect the present invention provides an apparatus for forming a corrugated fluoropolymer tube, said apparatus comprising: a mandrel for supporting the fluoropolymer tube; and a device for exerting external force on outer surface regions of the tube on the mandrel, the force exceeding the elastic limit of the fluropolymer material to form corrugations having adjacent peaks and roots by displacing material from the root regions at a temperature below the melting temperature, while maintaining a relatively smooth inner bore; characterized in that said mandrel having a first cylindrical portion and a flaring portion extending to a second cylindrical portion having an enlarged diameter to expand the tube in the flaring portion, and said device for exerting external force comprises a plurality of thread rollers which are mounted circumferentially distributed at the same radial distance around the mandrel along the flaring portion and/or the enlarged diameter second cylindrical portion of the mandrel so that the outer surface of the tube is forced into profiles of flights of the thread rollers which are arranged to be rotatable around their longitudinal roller axes and rotatable around the tube relative to the tube, said flights of the thread rollers being disposed at a pitch angle with respect to a plane perpendicular to the longitudinal axis of the mandrel.

A transport mechanism may be provided for moving the tube along the longitudinal direction of the mandrel through the thread rollers, which transport mechanism is arranged to move the tube with a speed determined by the pitch angle of the flights of the thread rollers and the number of revolutions of the thread rollers per unit of time.

In a preferred embodiment each of the thread rollers comprises a sequence of adjacent annular flights, each flight disposed in a plane perpendicular to the longitudinal axis of the thread roller, where the longitudinal axis of each thread roller being disposed at the pitch angle with respect to the longitudinal axis of the mandrel.

In a preferred embodiment the thread rollers are arranged such that the height of the flights over the roller surface increases in moving direction of the tube along the thread rollers. In this manner the roots of the corrugations are progressively deepened while the tube moves along the rotating thread rollers.

In a preferred embodiment the thread rollers are mounted circumferentially distributed around the mandrel in a thread roller head. The thread rollers are mounted in bearings in the thread roller head to be freely rotatable around the longitudinal axis. The thread roller head is disposed coaxial to the longitudinal axis of the mandrel and is mounted to be rotatable as a whole around the mandrel axis. A drive is provided to rotate the thread roller head to rotate around the tube on the mandrel so that the thread rollers roll on the tube while the thread roller head is rotating around the tube. In such arrangement no drive for rotating the thread rollers themselves are needed.

The corrugated tubes made according to the invention are often combined with various reinforcing layers such as stainless steel braids and protective jackets (such as EPDM rubber and silicone). The braids and covers are often applied as a separate process during the assembly of the tubes into hose assembly products with end fittings.

The invention will now be described with reference to an exemplary embodiment shown in the drawings in which:

FIGS. 1 and 3 show schematical perspective views of the main components of an apparatus for forming a corrugated fluoropolymer tube. There is a central mandrel 2 which is shown here without its mounting to simplify the Figures.

Figure 4:
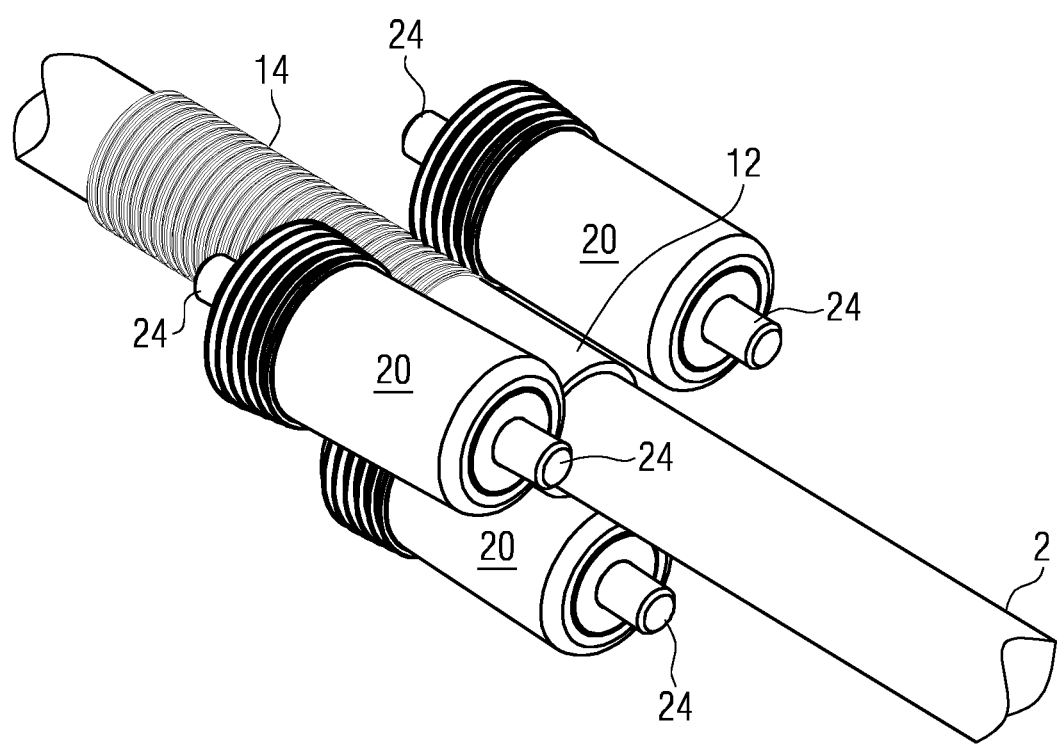
FIG. 4 shows a perspective view as in FIG. 3, with parts of the components removed to illustrate components acting on a tube on a mandrel of the apparatus of the embodiment.

In the drawings only a short length of a tube 10 is shown for reasons of simplification. As can be seen in FIG. 4 the rearward end of the still smooth cylindrical tube portion 12 is already between the rearward portions of the thread rollers 20 so that this tube portion is not visible in the remaining Figures in which the corrugated tube portion 14 is already moving forward out of the thread roller head 30.

A thread roller head 30 is disposed coaxially to the mandrel 2 which extends through the thread roller head 30. In the thread roller head 30 there are three thread rollers 20 which are disposed circumferentially distributed around the mandrel 2 at the same radial distance to the longitudinal axis of the mandrel 2. The radial distance of the thread rollers to the longitudinal axis of the mandrel 2 can be adjusted, as will be explained further below, so that the thread rollers can be moved over certain radial distance to the longitudinal axis of the mandrel 2 and can be fixed at a desired radial distance for operation. In operation, when corrugations are to be formed on a tube, the radial distance of the thread rollers is identical for all thread rollers.

This adjustability of the radial positioning of the thread rollers may be utilized when a tube is first introduced into the thread roller head 30. For this purpose the fixation mechanisms for the thread rollers are opened and they are moved to a radially outer position such that a tube 10 may be moved along the mandrel and into the thread roller head, whereafter the thread rollers are moved back to their working position in which flights of each head roller are pressed into the wall of the tube. In this working position the thread rollers are then fixed again against radial movements and the operation of the thread roller head 30 begins as will be described further below. Alternatively, the thread rollers 30 may be desired radial working position, and then the tube is advanced on the mandrel so that the tube is pushed into the flights of the rotating thread rollers 20 to form the corrugations by displacing tube material from the root regions.

Figure 1:
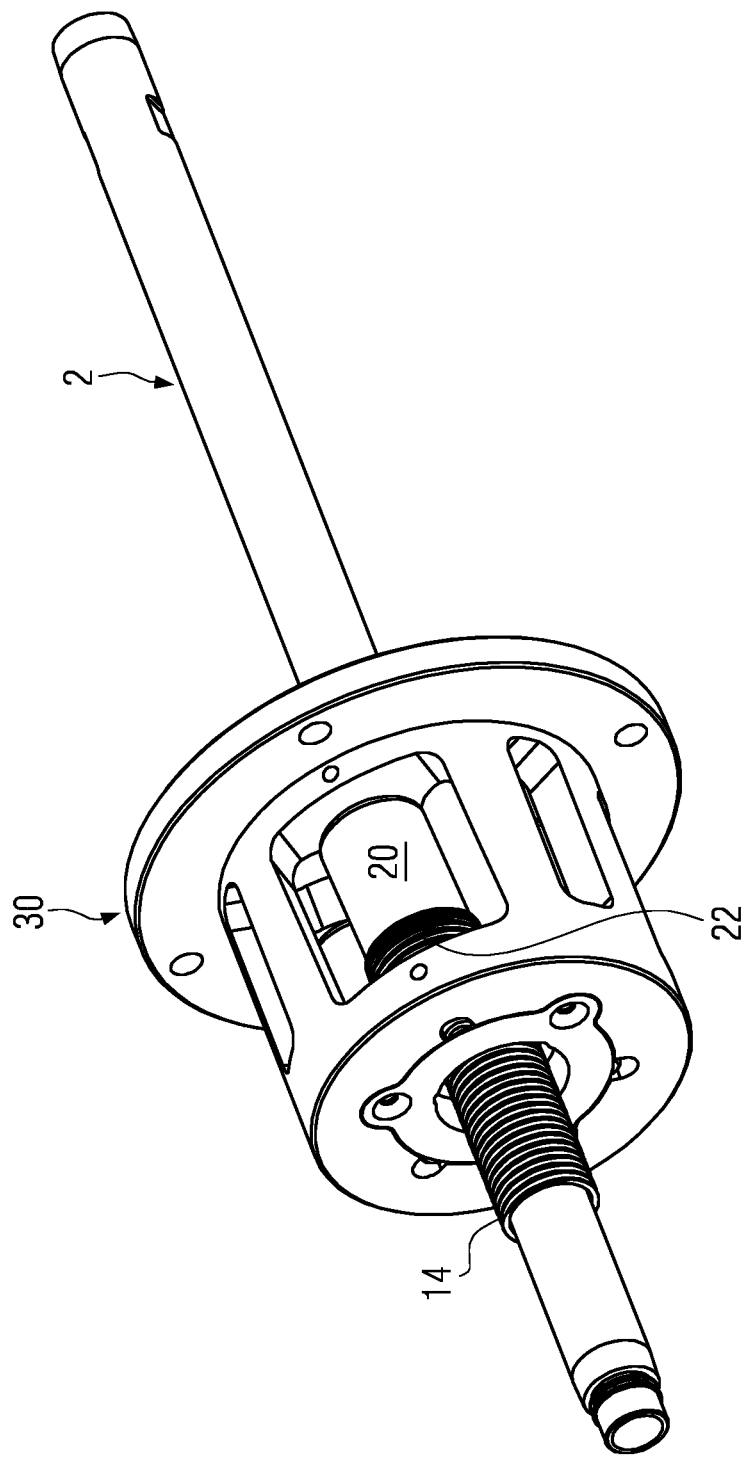
FIG. 1 shows a schematical perspective view of the main components of an apparatus according to the invention which is suitable for carrying out a method according to the present invention.
Figure 2:
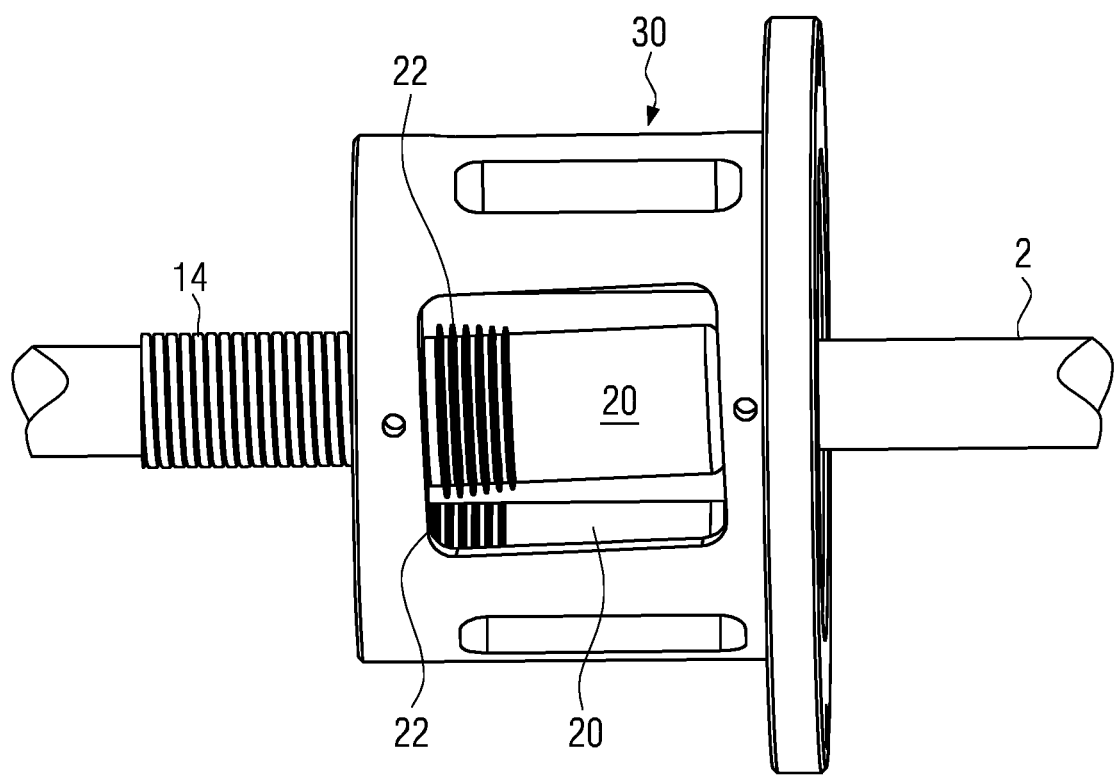
FIG. 2 shows plane views of the central portion of the apparatus according to FIG. 1 from opposite sides.
Figure 2:
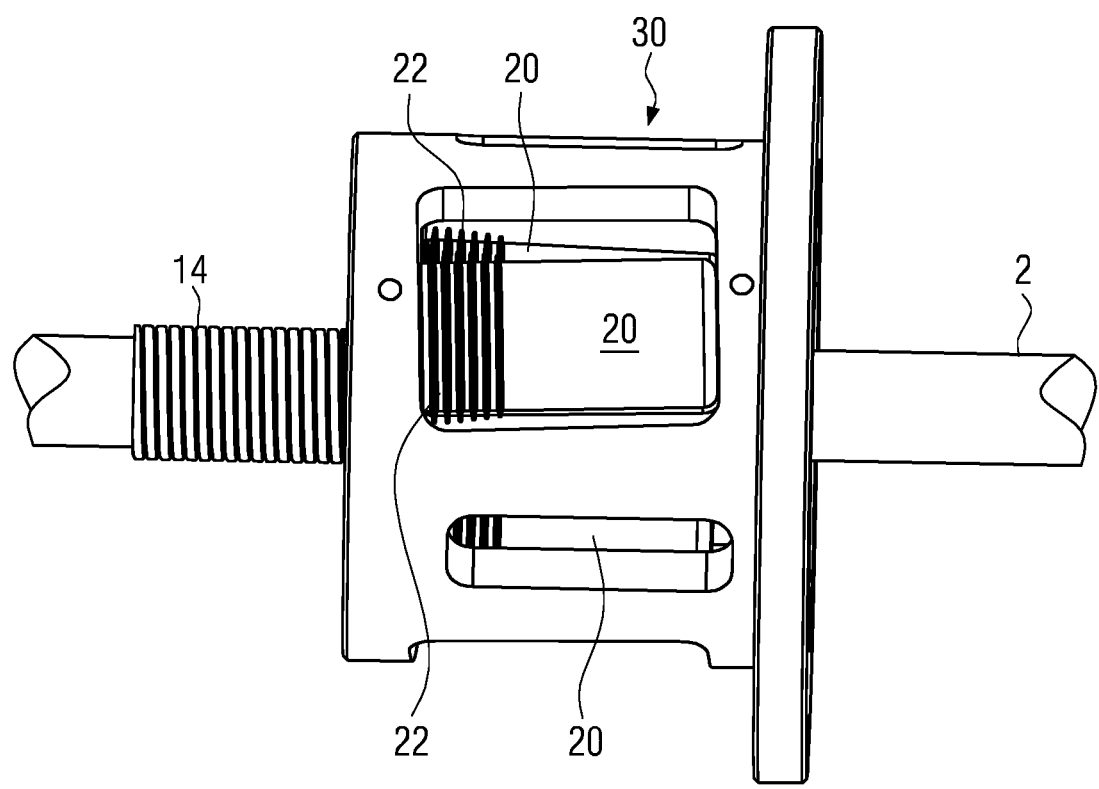
Figure 5A:
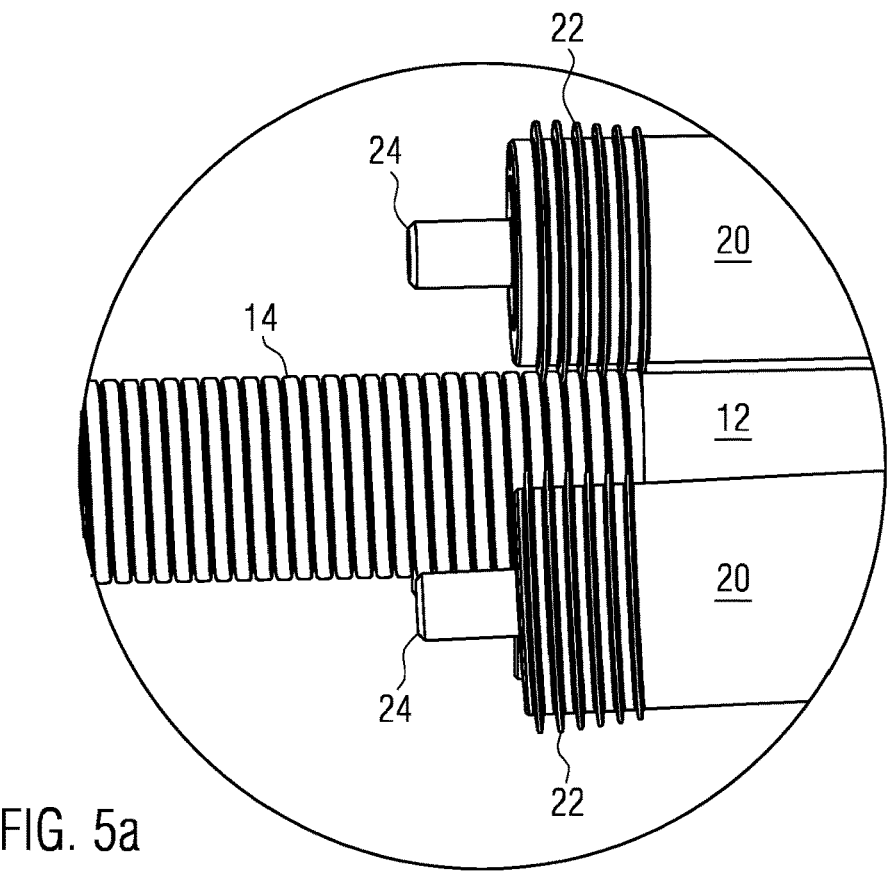
FIGS. 5a and 5b show perspective detailed views of the inner components shown in FIG. 4, wherein in FIG. 5a no tube is shown on mandrel, and in FIG. 5b the tube is included.
Figure 5B:
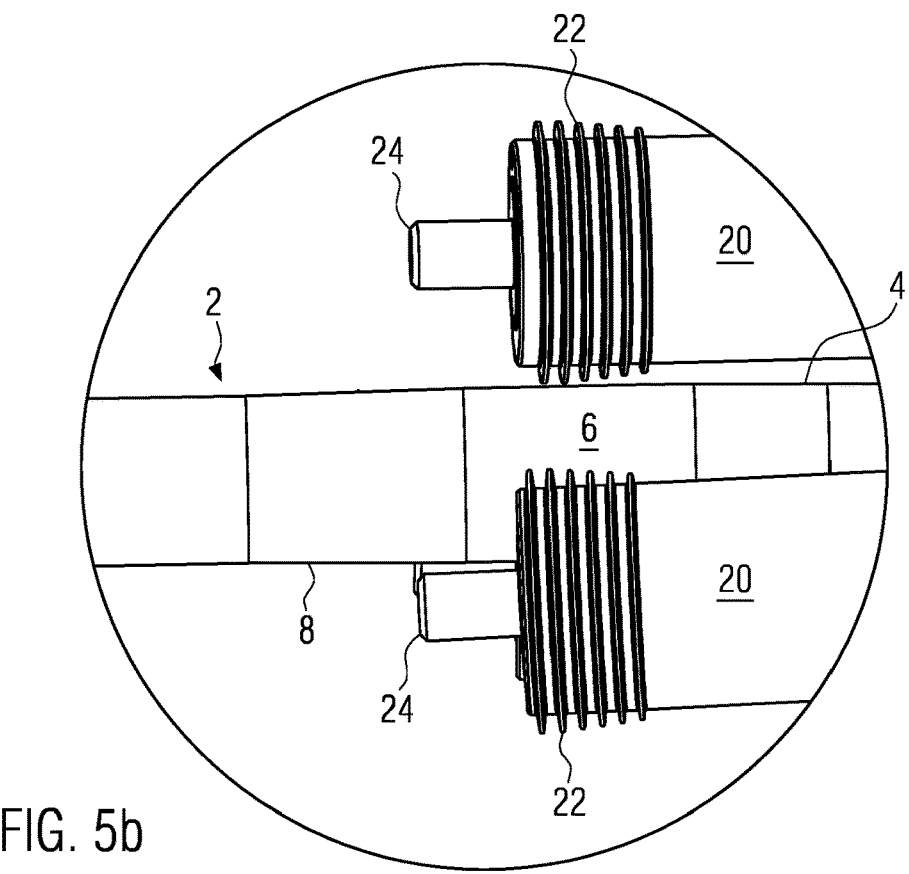

As shown in the detailed views of FIG. 5a and FIG. 5b each a thread roller 20 is provided with flights 22, wherein only one of the flights 22 is provided with this reference numeral to simplify the illustration. In this embodiment there are six annular flights 22 on each thread roller 20, wherein these six annular flights are disposed perpendicular to the longitudinal axis of rotation of the thread roller 20. In order to have a pitch angle between the flights 22 and the longitudinal axis of the mandrel 2 and tube 10 the thread rollers 20 are mounted in the thread roller head 30 such that the longitudinal axes of rotation of the thread rollers are disposed at the pitch angle with respect to the longitudinal axis of the mandrel 2. This slightly slanted or inclined orientation of the longitudinal axis of rotation of the thread rollers 20 with respect to the longitudinal axis of the mandrel 2 can for example be seen in FIGS. 2 and 4. It can be seen that the thread rollers are disposed such that their longitudinal axes are slightly inclined with respect to the longitudinal axis of the mandrel 2.

Each thread roller 20 comprises a central shaft 24 which projects from both opposite end faces of each thread roller 20 as can for example be seen in FIG. 4. These opposite ends of the shafts 34 are received in oblong apertures 34 of the thread roller head, which oblong apertures are shown for example in FIG. 3 and in FIGS. 6a and 6b. The thread rollers are free to rotate with their central shaft rotating in the oblong apertures 34. Bearings are used to mount the thread rollers at an adjustable radial distance to the central axis of the mandrel. In a simple design shims can be used, with the number of shims determining the radial distance of the thread rollers. In another exemplary design the central shaft 24 can be rotatably mounted in bushings on both ends of the roller portion of the thread rollers 20, wherein the central shaft 24 is free to rotate in the bushings and the bushings are held in the thread roller head such that the radial distance of the bushings the central axis of the mandrel can be adjusted.

Each thread roller 20 is provided with six annular flights which are disposed perpendicular to the longitudinal axis of the respective thread roller. As can best be seen from FIG. 5a the height of the flights 22 increases in transport direction of the tube, i.e. from the right to the left in the views of FIGS. 5a and 5b. Due to this design a root region is progressively deepened while the successive flights pass the root region, beginning with the flight with the lowest height up to the flight 22 with the largest height.

Before starting the method for forming a corrugated fluoropolymer the thread rollers are set at a fixed radial position to the mandrel. Then the tube is advanced on the mandrel while the thread roller head is driven to rotate around its longitudinal axis, and the thread rollers start to act on the tube once it reaches the thread roller flights. Alternatively, the thread roller head 30 is first brought to its open position, i.e. the thread rollers are radially outwards such that a tube with smooth inner and outer surfaces can be moved along the mandrel 2 and into the thread roller head 30 such that the front end portion of the tube is disposed in the region of the first flight of the thread rollers 20, i.e. the flight with the lowest height over the surface of the thread roller 20. Thereafter, the thread rollers are moved radially inwards and pressed onto the front end portion of the tube such that the flight at this end portion is pressed into the outer surface of the tube to form a first initial root by displacing material. In this radial position of the thread rollers their radial positioning is fixed. Then the thread roller 30 as a whole is driven to rotate around the longitudinal axis of the mandrel 2. The thread rollers 20 are freely rotatable in their bearings in the thread roller head 30 such that they roll on the surface of the tube while forming successive roots and peaks.

At the same time the tube is pulled in a longitudinal direction of the mandrel 2 at a controlled speed which is determined by the pitch angle of the flights with respect to the longitudinal axis of the mandrel and the rotational speed of the thread rollers 20 when rolling on the tube. The drive mechanism which is coupled to the thread roller head 30 for rotating it and the bearings for the thread roller head 30 are not shown in the Figures.

The shape of the mandrel in the region of the thread roller 30 best can see in FIG. 5b. Over most of its length the tube 10 is moved on a cylindrical portion of the mandrel 10 which has an outer diameter corresponding to the inner diameter of the tube such that the tube loosely fits on the mandrel. In the region of the thread roller head 30 the mandrel 10 has a flaring portion 4 in which the outer diameter is continuously increasing to a second cylindrical region 6 of enlarged diameter. Following the second cylindrical portion 6 of enlarged diameter a slightly tapering portion 8 of the mandrel follows in which the outer diameter is reduced again to the outer diameter of the main cylindrical portion of mandrel 2. While the tube is moved over the flaring portion it is slightly expanded. This shape of the mandrel is ensuring that the expanded tube portion is circular. This is of importance if the original smooth, in the ideal case cylindrical, tube to be processed has certain shape irregularities in some regions of the tube, for example a slight oval shape over a certain length portion. Such shape irregularities are compensated when the tube is expanded when moving along the flaring portion 4 such that the expanded tube in the second cylindrical portion 6 of enlarged diameter is tightly fitting on this portion of the mandrel. In this manner it is ensured that the tube is in a circular configuration and is supported by the second and cylindrical portion 6 of enlarged diameter circumferentially at each point of the tube so that the thread rollers can act on it in a controlled manner. Of course, the expansion of the tube increases the force needed to move the tube along the mandrel to some extent. However, this is more than compensated by the exact positioning and consistent support of the tube when it is expanded or expanding. In principle it would also be feasible to position the mandrel relative to the thread roller head such that the flights 22 of the thread rollers are disposed in the flaring portion 4 of the mandrel.

Figure 6A:
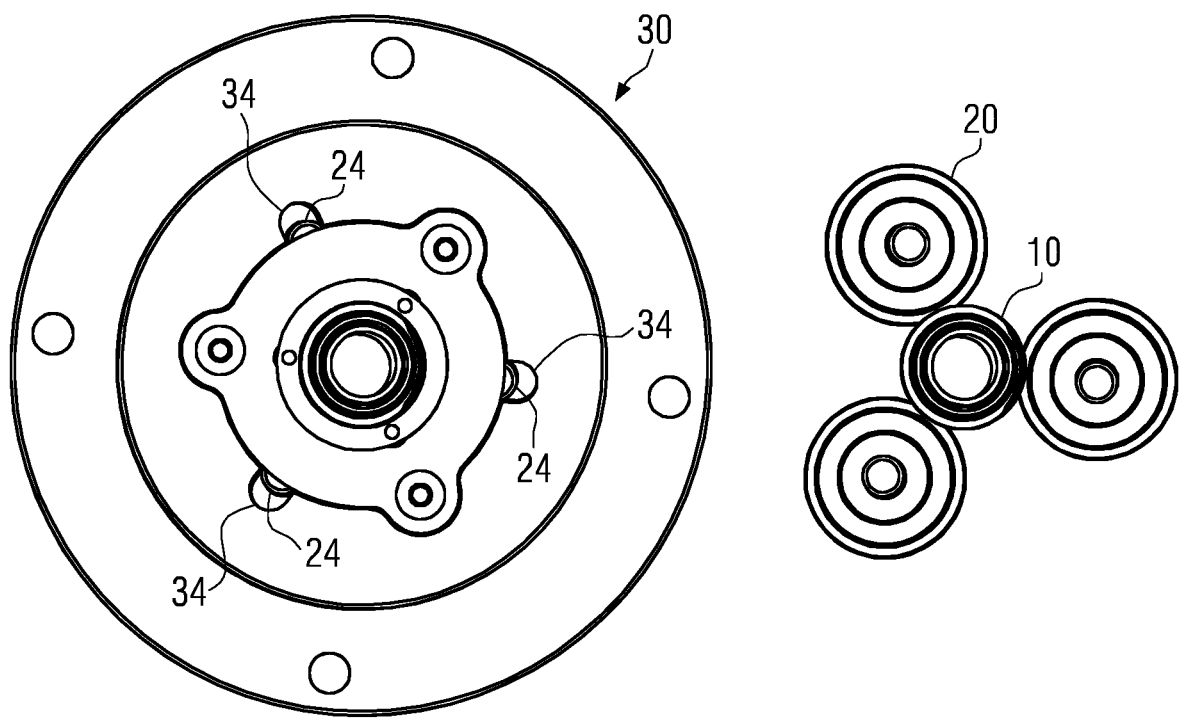
FIGS. 6a and 6b show end views of the apparatus of this embodiment from opposite sides, in each case with the thread roller arrangement around the central mandrel shown separately.
Figure 6B:
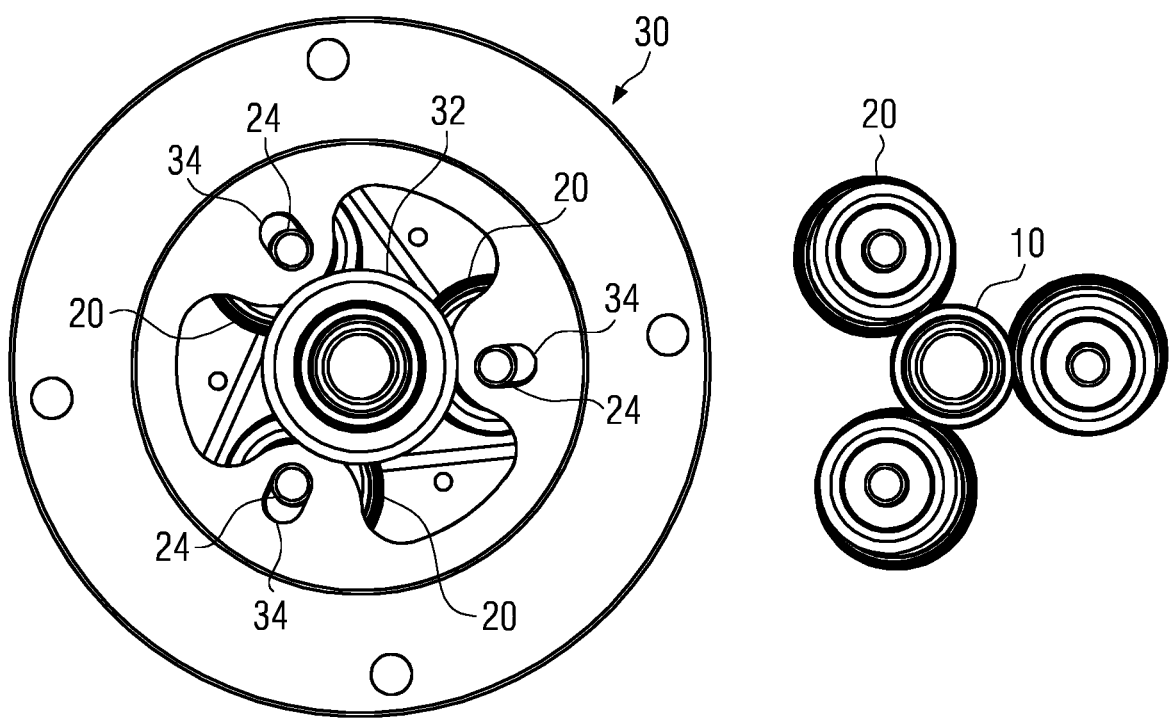

FIG. 6a shows a plan view of the front face of the thread roller head 30, i.e. the end from which the tube moves out after the corrugations have been formed. There are three radially oblong apertures 34, each receiving one end of the central shaft 24 of one of the thread rollers 20. On the opposite side of the thread roller head 30, as shown in FIG. 6b, there are three corresponding oblong apertures 34 receiving the opposite ends of the central shafts 24 of the thread rollers. There is a small offset between the oblong apertures 34 shown in FIGS. 6a and 6b, respectively, so that the longitudinal axes of the central shafts 24 are inclined at the pitch angle with respect to the longitudinal axis of the mandrel 2 (which coincides with the longitudinal axis of rotation of the thread roller head 30).

Figure 3:
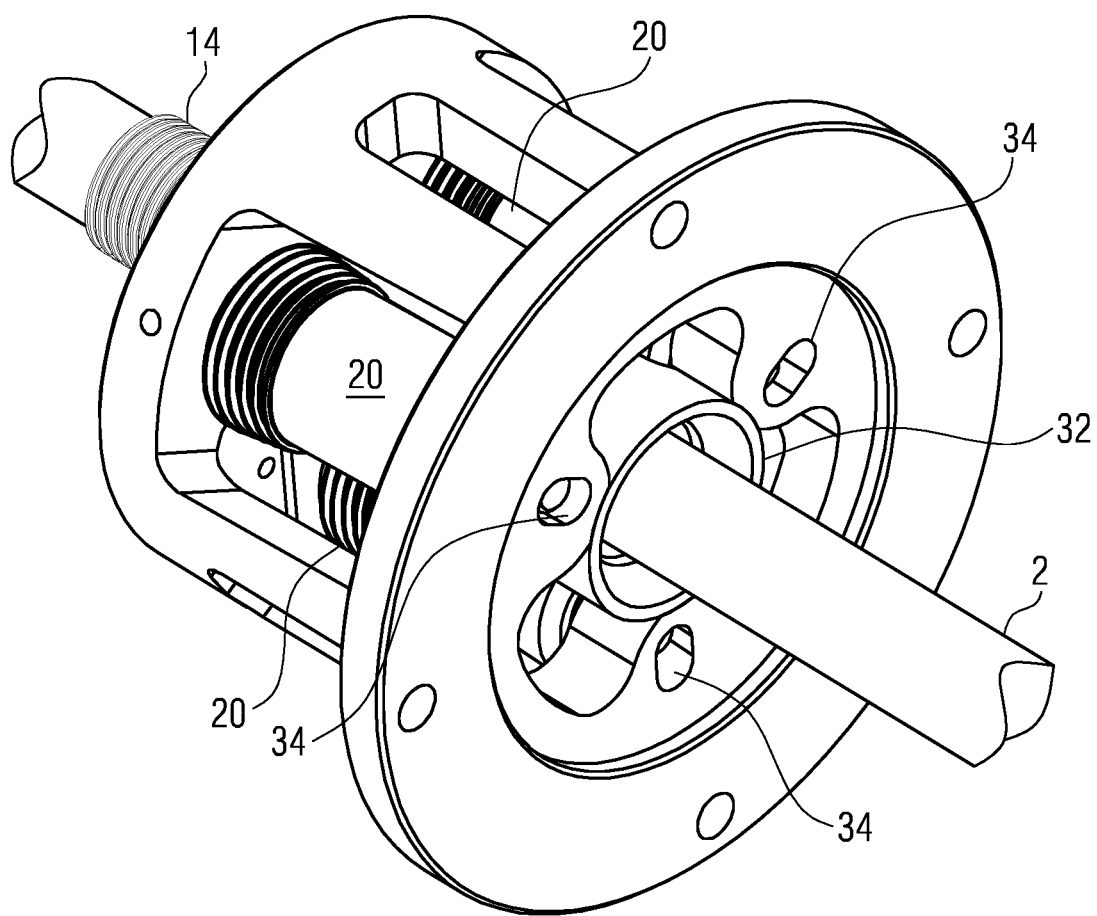
FIG. 3 shows another perspective view of the apparatus as in FIG. 1.

In the entry end of the thread roller head 30 shown in FIGS. 3 and 6b the end portion of a guide funnel 32 is visible into which the tube is introduced when it is moved along the mandrel 2 for introducing the tube into the thread roller head. The function of the guide funnel is to counteract the forces that are applied from the rollers. In the regions in between rollers, the tube is forced radially outwards. The funnel tube acts as a buffer to keep the tube from deforming.

The guide funnel 32 has three cutouts in its outer wall so that portions of the thread rollers 20 and the flights 22 extend through the cutouts towards the tube which is moved on the mandrel through the guide funnel 32.

The core of the mandrel can be temperature controlled, for example it can be cooled. For the latter purpose water or coolant (which can be chilled) may be pumped through the core of the mandrel to ensure the mandrel and thus the inner surface of the tube stays cool which may reduce the amount of deformation to ensure a relatively smooth bore.

Water or coolant (which can be chilled) may be pumped over the tubing as it emerges from the thread rolling head. This facilitates to stabilize the material tube after forming of the roots and peaks, in particular when the tube has been heated (even though being below the melt temperature) before or during passing through the thread rollers. In this manner the tube can be handled in a safe manner immediately after exiting the thread rollers without any restrictions even if it has been at an elevated temperature when the thread rollers acted on it to form the corrugations.

The invention claimed is:

1. A method for forming a corrugated fluoropolymer tube comprising the steps of:
   providing a tube comprising extruded fluoropolymer without corrugations or convolutions disposed on a mandrel having a first cylindrical portion and a flaring portion that extends to a second cylindrical portion, the second cylindrical portion having an outer diameter which is larger than an outer diameter of the first cylindrical portion; and
   moving the tube on a longitudinal axis along the mandrel thereby forcing an outer surface of the tube into flights in a transverse orientation relative to the longitudinal axis along the mandrel and disposed at a pitch angle on a plurality of thread rollers which are rotating on rotational axes that are substantially parallel to the longitudinal axis along the mandrel, the plurality of thread rollers adjacent to and circumferentially distributed around the flaring portion and/or second cylindrical portion of the mandrel,
   wherein external force is exerted on the outer surface of the tube beyond an elastic limit of the fluoropolymer to form corrugations having adjacent peaks and roots by displacing fluoropolymer from the roots at a temperature below the melting temperature of the fluoropolymer, while maintaining a smooth inner surface of the tube.

2. The method for forming a corrugated fluoropolymer tube according to claim 1, wherein each of the thread rollers comprise an annular flight disposed in a plane perpendicular to a longitudinal axis of the thread roller.

3. The method for forming a corrugated fluoropolymer tube according to claim 2, wherein a depth of the roots of the corrugations is increased as the tube is moved along the longitudinal axis between the mandrel and the thread rollers by arranging adjacent flights on each thread roller such that a height of each of the adjacent flights increases in a moving direction of the tube through the thread rollers.

4. The method for forming a corrugated fluoropolymer tube according to claim 1, wherein the flight of each thread roller is a continuous helical flight.

5. The method for forming a corrugated fluoropolymer tube according to claim 1, wherein movement of the tube between the mandrel and the thread rollers is supported by a transport mechanism conveying the tube at a controlled speed.

6. The method for forming a corrugated fluoropolymer tube according to claim 5, wherein movement of the tube is supported by a transport mechanism including a feed caterpillar disposed upstream of the thread rollers and a pull caterpillar downstream of the thread rollers.

7. The method for forming a corrugated fluoropolymer tube according to claim 1, wherein said exerting of external force occurs around the second cylindrical portion of the mandrel.

8. The method for forming a corrugated fluoropolymer tube according to claim 1, wherein the fluoropolymer of the tube is heated to an elevated temperature when the thread rollers form the corrugations, and that the thread rollers are heated.

9. The method for forming a corrugated fluoropolymer tube according to claim 1, wherein the thread rollers are rotated by rotating a thread roller head in which the thread rollers are mounted and circumferentially distributed around the mandrel and freely rotational around their longitudinal axes so that thread rollers roll on the tube while the thread roller head is rotating around the tube.

10. The method for forming a corrugated fluoropolymer tube according to claim 1, wherein the tube is moved along the mandrel by the flights of the rotating thread rollers, wherein the flights at the pitch angle advance the tube to move the tube along the mandrel.

11. The method for forming a corrugated fluoropolymer tube according to claim 1, wherein the mandrel is temperature controlled to be at a predetermined temperature.

12. The method for forming a corrugated fluoropolymer tube according to claim 1, wherein the tube is cooled subsequent to moving between the mandrel and the thread rollers to ensure it can be handled upon exit from the thread rollers.

13. An apparatus for forming a corrugated fluoropolymer tube from a fluoropolymer tube, said apparatus comprising:
   a mandrel having a longitudinal axis for supporting a tube comprising extruded fluoropolymer without corrugations or convolutions; and
   a device for exerting an external force on an outer surface of the tube on the mandrel, the external force exceeding an elastic limit of the fluoropolymer to form corrugations having adjacent peaks and roots by displacing material from the roots at a temperature below the melting temperature of the fluoropolymer, while maintaining a smooth inner surface of the tube;
   wherein
      the mandrel has a first cylindrical portion and a flaring portion that extends to a second cylindrical portion, the second cylindrical portion having an outer diameter which is larger than an outer diameter of the first cylindrical portion to expand the tube; and
      the device for exerting external force comprises a plurality of rotatably mounted thread rollers adjacent to and circumferentially distributed around the flaring portion and/or second cylindrical portion of the mandrel, the thread rollers having rotational axes that are substantially parallel to the longitudinal axis along the mandrel and a flight in a transverse orientation relative to the longitudinal axis along the mandrel and disposed at a pitch angle thereon; and
      arranged such that the outer surface of the tube is expanded by the flaring portion and is forced into the flights of the thread rollers to displace fluoropolymer of the tube in a cold forming process to form corrugations having adjacent peaks and roots.

14. The apparatus for forming a corrugated fluoropolymer tube according to claim 13, wherein the flight of each of the thread rollers comprises a sequence of adjacent annular flights disposed in a plane perpendicular to a longitudinal axis of the thread roller, the longitudinal axis being disposed at the pitch angle with respect to a longitudinal axis of the mandrel.

15. The apparatus for forming a corrugated fluoropolymer tube according to claim 14, wherein the thread rollers are arranged such that a height of the flights over a roller surface of the thread roller increases in a longitudinal direction along the thread roller.

16. The apparatus for forming a corrugated fluoropolymer tube according to claim 13, wherein the thread rollers are mounted circumferentially distributed around the mandrel in a thread roller head, that the thread rollers are mounted in bearings in the thread roller head to be freely rotatable around their longitudinal axes, and that a drive is provided to rotate the thread roller head to rotate around the tube on the mandrel so that thread rollers roll on the tube while the thread roller head is rotating around the tube.

17. The apparatus for forming a corrugated fluoropolymer tube according to claim 13, wherein each of the thread rollers comprise an annular flight disposed in a plane perpendicular to a longitudinal axis of the thread roller.

* * * * *